(12) United States Patent
Blumberg

(10) Patent No.: US 6,449,639 B1
(45) Date of Patent: Sep. 10, 2002

(54) METHOD AND SYSTEM FOR CLIENT-LESS VIEWING OF SCALABLE DOCUMENTS DISPLAYED USING INTERNET IMAGING PROTOCOL COMMANDS

(75) Inventor: Robert Blumberg, Santa Cruz, CA (US)

(73) Assignee: Doxio, Inc., Santa Clara, CA (US)

(*) Notice: Subject to any disclaimer, the term of this patent is extended or adjusted under 35 U.S.C. 154(b) by 0 days.

(21) Appl. No.: 09/221,207

(22) Filed: Dec. 23, 1998

(51) Int. Cl.[7] .......................... G06F 15/16; G06F 15/00
(52) U.S. Cl. ...................... 709/217; 709/218; 709/203; 707/522
(58) Field of Search ................................ 709/217, 218, 709/219, 201, 203; 707/500, 522, 510–513

(56) References Cited

U.S. PATENT DOCUMENTS

| | | | | |
|---|---|---|---|---|
| 5,956,033 A | * | 9/1999 | Tee et al. | 345/349 |
| 6,014,671 A | * | 1/2000 | Castelli et al. | 707/101 |
| 6,075,535 A | * | 6/2000 | Fizhugh et al. | 345/352 |
| 6,121,970 A | * | 9/2000 | Geudalia | 345/357 |
| 6,167,442 A | * | 12/2000 | Sutherland et al. | 709/217 |
| 6,192,393 B1 | * | 2/2001 | Tarantino et al. | 709/203 |
| 6,199,082 B1 | * | 3/2001 | Ferrel et al. | 707/522 |
| 6,205,452 B1 | * | 3/2001 | Warmus et al. | 707/500 |
| 6,237,010 B1 | * | 5/2001 | Hui et al. | 707/502 |
| 6,323,965 B1 | * | 12/2001 | Castelli et al. | 345/420 |

OTHER PUBLICATIONS

"Internet Imaging Protocol Version 1.0.6", Hewlett Packard Company, Live Picture, Inc., and Eastman Kodak Company Nov. 21, 1997, pp. 1–74.

"FlashPix Format Specification Version 1.01", Eastman Kodak Company, Jul. 10, 1997, pp. i–x, and 1–144.

* cited by examiner

Primary Examiner—Mehmet B. Geckil
Assistant Examiner—Beatriz Prieto
(74) Attorney, Agent, or Firm—Blakely, Sokoloff, Taylor & Zafman LLP

(57) ABSTRACT

A method and system for viewing a document containing at least one page and at least one image, the document being located on a server computer, including sending by a client computer a page display request to the server computer creating by the server computer a layout page containing a reference to stored image data, transmitting the layout page from the server computer to the client computer, sending an image data request to a remote computer according to the reference to stored image data, and transmitting requested image data from the remote computer to the client computer in response to the image data request.

90 Claims, 6 Drawing Sheets

METHOD AND SYSTEM FOR CLIENT-LESS VIEWING OF SCALABLE DOCUMENTS DISPLAYED USING INTERNET IMAGING PROTOCOL COMMANDS

FIELD OF THE INVENTION

The present invention relates to electronic documents containing raster images.

BACKGROUND OF THE INVENTION

PostScript is a resolution-independent format. Fonts can be enlarged or reduced in size to accommodate any viewing resolution. When a viewer zooms in or out of a document, the text characters automatically scale accordingly. Thus it can be said that font characters are "scalable."

Similarly, graphical objects based on vector graphics consisting of line segments and curves are also scalable. The line segments and curves can be enlarged or reduced in size by appropriately modifying the pixel coordinates of their control points.

Raster graphics, on the other hand, is not scalable. An image expressed in raster graphics is by its nature pixel resolution specific, and to enlarge or reduce the image involves digital image filtering and interpolation. Moreover, a raster image cannot be stretched beyond its original pixel resolution without introducing artificial data.

SUMMARY OF THE INVENTION

The present invention provides an electronic document, including one or more raster images, which is scalable. The raster images are referenced within the document through dynamically changing references, and it is the control of the dynamic references that provides for the scalability. The scalable document of the present invention can be enlarged or reduced to any desired resolution, making the entire document scalable—text characters, graphical objects and raster images.

Regardless of the viewing configuration, a raster image referenced within the scalable document of the present invention will automatically scale according to the viewing resolution. For example, suppose a 6"×8" photograph is converted to a high quality digital image by scanning at 600 dots per inch (dpi). This produces a 3,600×4,800 pixel image, which is embedded into a page of the document.

When this page is viewed at normal size on a view monitor having 72 dpi resolution, the referenced image is scaled to 432×576 pixels for purposes of display. If a user zooms in by a factor of two, to see a portion of the page containing the image at higher resolution, the referenced image is scaled to 864×1,152 pixels. Thus the dimensions of the image referenced within the document automatically scale to twice their original values. If the document is printed on a 300 dpi color printer, the referenced image is scaled to 1,800×2,400 pixels in order to produce as high quality a print as possible using the color printer as an output device.

In a preferred embodiment of the present invention the referenced images are located on one or more image servers on the Internet or any other suitable computer network, and may be viewed on remote client computers. The raster images are not embedded within the scalable document, but rather are stored as separate files. The scalable document contains references to the raster images embedded therewithin, thus making the size of the scalable document relatively small. Upon display, the document will include screen-size images within it. Upon delivery or print, the document will include images scaled to the appropriate device resolution.

Each client computer preferably downloads only the portion of the image data that is necessary for satisfying a user display request, as described hereinbelow. Continuing with the example above, the 3,600×4,800 image uncompressed occupies a total of 51.84 MB (at 3 bytes per pixel). High fidelity compression typically reduces this by an order of magnitude, to roughly 5 MB. Rather than requiring each client to download the entire 5 MB of image data, the present invention only requires the clients to download that portion of the image data necessary to satisfy the user display request. The user display request is significantly less than the entire image size, since the maximum size image that can be viewed on a video monitor is the full video monitor pixel resolution, which may be 768×1,024 for example. Similarly when saving or printing the document, the user may specify a resolution less than 600 dpi for the save operation, or the printer resolution may be less than 600 dpi, in which case the client only needs to download a portion of the full image data The present invention also provides a rendition tool for converting standard documents with large high quality images into scalable documents, and a delivery tool for converting scalable documents into standard documents. The rendition tool is used for creating Web-Ready documents with screen-size images for interactive viewing. The delivery tool is used for saving documents containing high quality images at user specified resolutions, and for printing such documents at resolutions appropriate to specified output devices.

There is thus provided in accordance with a preferred embodiment of the present invention a method for viewing a document containing at least one page and at least one image, the document being located on a server computer, including the steps of sending by a client computer a page display request to the server computer, creating by the server computer a layout page containing a reference to stored image data, transmitting the layout page from the server computer to the client computer, sending an image data request to a remote computer according to the reference to stored image data, and transmitting requested image data from the remote computer to the client computer in response to the image data request.

There is also provided in accordance with a preferred embodiment of the present invention a system for viewing a document containing at least one page and at least one image, the document being located on a server computer, including a client computer transmitter sending a page display request to the server computer and sending an image data request to a remote computer according to a reference to stored image data, a layout page producer within the server computer creating a layout page containing the reference to stored image data, a server computer transmitter transmitting the layout page to the client computer, and a remote computer transmitter transmitting requested image data to the client computer in response to the image data request.

There is also provided in accordance with a preferred embodiment of the present invention a scalable document including at least one layout page, and at least one reference to stored image data, the at least one reference including at least one command for processing the stored image data.

There is also provided in accordance with a preferred embodiment of the present invention a method for converting a document containing at least one image into a scalable document, including extracting at least one image from the document, storing the at least one image as stored image data, and replacing the at least one image by at least one reference to stored image data, the at least one reference containing at least one command for processing the stored image data.

There is also provided in accordance with a preferred embodiment of the present invention a system for converting a document containing at least one image into a scalable document, including an object extractor extracting at least one image from the document, a storage device for storing the at least one image as stored image data, and a reference inserter replacing the at least one image by at least one reference to the stored image data, the at least one reference containing at least one command for processing the stored image data.

There is also provided in accordance with a preferred embodiment of the present invention a method for converting a scalable document into a standard document using at least one reference to stored image data, the scalable document containing at least one layout page, and the at least one reference including at least one command for processing the stored image data, including processing the stored image data in accordance with the at least one command, producing at least one image, and positioning the at least one image within the scalable document according to positioning instructions within the layout page.

There is also provided in accordance with a preferred embodiment of the present invention a system for converting a scalable document into a standard document using at least one reference to stored image data, the scalable document containing at least one layout page, and the at least one reference including at least one command for processing the stored image data, including an image processor processing the stored image data in accordance with the at least one command, producing at least one image, and an image positioner positioning the at least one image within the scalable document according to positioning instructions within the layout page.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

The present invention concerns Internet publishing, and provides the capability for storing electronic documents on a web server computer and enabling remote clients to interactively view, download and print the documents using web browsers.

Internet Publishing

A web browser is software running on a client computer that retrieves HTML pages from server computers using the HTTP protocol, and displays them. A hyper-text markup language (HTML) page is typically the basic data structure for a web page that appears on a video monitor whenever one is using the Internet. An HTML page typically contains layout instructions along with text, graphical objects, links and more. Objects referenced in an HTML page but located at remotes sites are typically referenced by a universal resource locator (URL), which contains a full IP address indicating where the object is located in addition to optional instructions for processing the object. Two well-known web browsers are Netscape Communications Corporation's Netscape® Communicator and Microsoft Corporation's Internet Explorers®.

A web server is software running on a server computer that delivers requested HTML pages to web browsers using the HTTP protocol.

Documents archived on a server computer can be accessed by remote client computers by means of web browsers. If a document is not in HTML format, additional server-side or client-side processing may be necessary. Such server-side processing involves auxiliary software on the server for converting each document page requested into HTML format for viewing by the client. Client-side processing involves auxiliary software used with the browser, in the form of a plug-in, an Active-X control or a Java applet, for interpreting the non-HTML format.

There is a general disinclination on the part of users to download client software, as this interrupts the web browsing and invasively installs new software on the user's computer. For example, if a user accesses a URL that requires a plug-in while browsing the web, he must download the plug-in software, exit the browser, install the plug-in and then re-initiate the browser. When server-side processing is used in such a way that no auxiliary client software is needed other than the web browser, the application is referred to as being "client-less." Client-less applications tend to be more favorable, as they do not require the user to interrupt his web browsing or to place additional software in his computer.

The present invention, as described hereinbelow, enables client-less applications to interactively view remotely located electronic documents by scaling and moving within pages.

Figure 1:
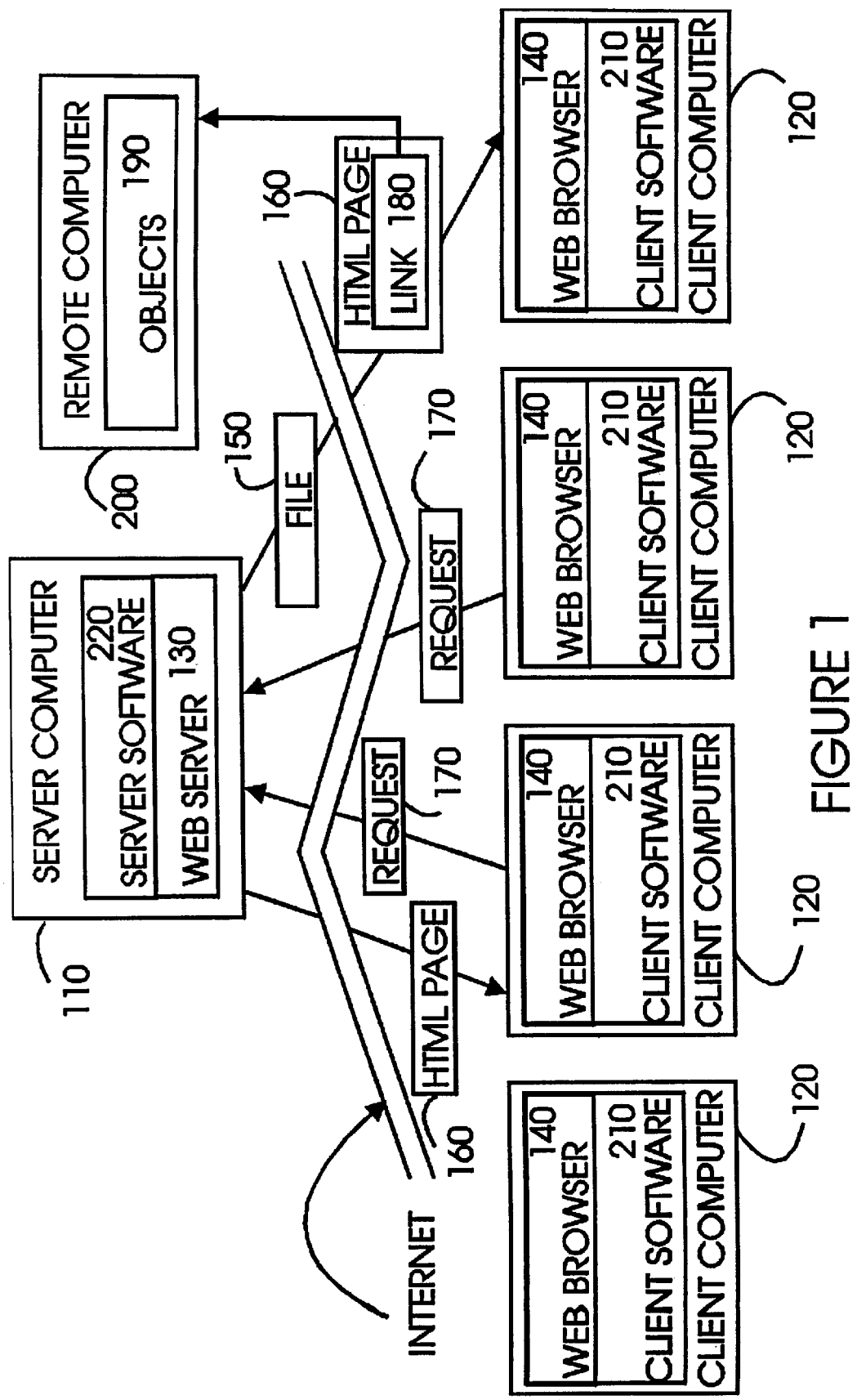
FIG. 1 is a simplified illustration of a network configuration for Internet publishing in which a preferred embodiment of the present invention operates.

Reference is now made to FIG. 1 which is a simplified illustration of a network configuration for Internet publishing in which a preferred embodiment of the present invention operates. A server computer 110 stores documents and HTML pages for remote access by multiple client computers 120. Server computer 110 contains a web server 130 for serving files 150 and HTML pages 160 to client computers 120 in response to requests 170. Client computers 120 typically contain web browsers 140 for displaying HTML pages 160, and typically use the links in HTML pages 160 to request documents and other HTML pages from server computer 110.

In a preferred embodiment of the present invention, the HTML pages 160 contain links 180 to objects 190, such as raster images, stored on remote computers 200 connected to the Internet.

Web browsers 140 typically can display only a limited number of different page formats, such as HTML. In order for a web browser to display a document that is not in one of the supported formats, auxiliary client software 210 may be needed to supplement the web browser so that it can interpret the document format. Alternatively, server software 220 can be used to convert the document into HTML format, so that it is ready for display by the web browser when the document arrives at the client computer. In this latter case there is no need for client software 210, and the application is client-less.

Resolution Independence

The present invention uses resolution independent image data requests to achieve scalability of raster images referenced within documents. Resolution independence is a technique for processing large digital images based on the tenet that an image can be considered as a continuum of color values distributed over a rectangular spatial region. That is, an image can be considered as a two-dimensional continuous spatial signal, analogous to a onedimensional continuous time signal. Carrying this analogy further, a continuous "resolution-independent" image can be converted to a discrete spatial array by sampling at appropriate frequencies in each dimension, just as a continuous time signal can be converted to a discrete time signal by sampling at an appropriate rate.

Resolution independent images are modeled by a continuous two-dimensional coordinate system with coordinates x and y ranging over a rectangular region that can be normalized as the unit square, $0 \leq x \leq 1$, $0 \leq y \leq 1$. Specifically, a resolution independent image is determined by a vector-valued function $f(x, y)$, with $f(x, y)$ indicating the color value at location $(x, y)$ as x and y range over the unit square. Color is typically prescribed by multiple values within a standard color space, such as RGB or CMYK.

In distributed imaging systems, one of the most common user requests is for access to a rectangular portion of an image. A rectangular portion can be described by a set of four values (t, l, h, w), where (t, l) are the coordinates of the top-left corner of the portion, h is the height of the portion and w is the width of the portion—all four numbers being relative to the normalized unit square. Thus, for example, the portion (0.25, 0.35, 0.15, 0.3) denotes the rectangle extending from top-left corner (0.25, 0.35) to bottom right corner (0.4, 0.65). The height of this rectangle is 15% of the total height of the image, and its width is 30% of the total width of the image.

Any digital image, no matter how large, does not contain more information than the sum total of its color values. Thus, considering a digital image to be a continuum of color values is an idealization. The extent to which this idealization applies is up to the point where the pixel dimension of the original image is exceeded. For large digital images, this leaves enough room to make the idealization a practical one. This idealization is analogous to the applicability of continuum mechanics to physical bodies up to the point where the atomic level is reached.

Discretization

The present invention involves three types of client requests for documents: (i) interactively displaying and navigating through the document on a video monitor, (ii) printing the document on a local or network printer, and (ii) delivering the document to the client computer; i.e. downloading the document, such as by means of a "Save As" operation. In order to display, print or save a resolution-independent image included within a document, the image must first be converted to a pixel array, which is a raster array of discrete pixel values. The required dimensions of the pixel array determine the sampling frequencies, and as long as these frequencies are each greater than or equal to one, the conversion can be accomplished without introducing artificial data. Every request for displaying, printing or saving a portion or all of an image can be described by a rectangle in resolution-independent coordinates, as described hereinabove, together with a pair of discrete pixel dimensions representing the width and height of the pixel array. The pixel array can represent a view window for display, a dot array for printing or a raster array for saving a raster image.

Consider, for example, a 6"×8" photograph that is converted to a high quality digital color image by scanning at 600 dots per inch (dpi). This produces a 3,600×4,800 pixel digital image. In order to view this entire image on a video monitor having 72 dpi resolution, the image has to be scaled to 432×576 pixels, which amounts to a reduction in size of the original image by a factor of 25/3=8.33 in each dimension; that is, the sampling frequency is 8.33 in each dimension. Using the resolution independent paradigm, the digital image is idealized as a resolution independent image, the rectangular portion designating the entire image is (0, 0, 1, 1) and the required view window size is 432×576 pixels.

If this same digital image is to be printed on a 300 dpi resolution color printer, then the relevant rectangular portion is (0, 0, 1, 1) and the required dot array size is 1,800×2,400 pixels. This corresponds to a sampling frequency of 2 in each dimension.

If a user wishes to display the top left quadrant of the image in a 450×600 view window, then the relevant resolution independent portion of the image is (0, 0, 0.5, 0.5) and the required view window size is 450×600 pixels. This corresponds to a sampling frequency of 4 in each dimension. On the other hand, if the user had wanted to save the top left quadrant of the image as a 2,400×3,200 pixel array, this would correspond to a sampling frequency of $\frac{2}{3}$ in each dimension. In this latter case, the limits of the resolution independent idealization are exceeded.

Image distribution systems that accommodate interactive display, printing and saving (i.e. downloading) can operate by (i) storing large digital images on server computers, (ii) accepting user requests for image data from remote client computers, each request being determined by a resolution independent rectangular portion and a pixel array size, and (iii) responding to such requests by transmitting appropriate image data from a server to a remote client. The Flashpix image format and the Internet Imaging Protocol, as described hereinbelow, were designed to make Internet image distribution systems as efficient as possible, by administering a "just enough data" policy and transmitting only the minimal amount of image data necessary to satisfy a client request.

Referring back to the abovementioned example, the 3,600×4,800 original image occupies a total of 3×3,600×4,800=51.84 MB uncompressed, at a pixel depth of 3 bytes per pixel. High fidelity compression such as JPEG typically reduces this by an order of magnitude to roughly 5 MB. In the first scenario above, where the user requests the entire image to be displayed at 432×576 pixel resolution, the image to be displayed occupies only 3×432×576=746,496 bytes uncompressed, which corresponds to approximately 75 KB compressed. Rather than transmit the entire 5 MB of image data from the server to the client, an efficient image distribution system transmits only the 75 MB of data, or slightly more as described below in reference to caching, necessary to render the desired display image.

Flashpix Image Format

Multi-resolution tiled (MRT) image formats are particularly well-suited for storing resolution independent images in such a way that specified rectangular portions of such an image can be efficiently generated at specified pixel resolutions. An MRT format stores the original image together with the successively reduced versions of the image. Moreover the image data for the original image and for each reduced version thereof is partitioned into blocks called tiles. As such, an MRT format is redundant in that the reduced versions of the image can be generated form the original image data but are nevertheless stored in the file. However, the advantage of the MRT format is that lower resolution image data is readily available, and the tile structure makes it simple to access rectangular portions of the image.

FLASHPIX, a trademark of the Digital Imaging Group (DIG), is an example of an MRT image format. A Flashpix image is generated by starting with an original image and recursively subsampling it at half of the previous resolution. The recursion continues until the final sub-sampled image is reduced to a size of 64 pixels or less in each dimension. Each resolution level is partitioned into image tiles that are 64×64 pixels in size, and the individual tiles can be stored as uncompressed or JPEG compressed image data. A reference for Flashpix is the document "Flashpix Format Specification,"© 1996, 1997, Eastman Kodak Company, the contents of which are hereby incorporated by reference.

Referring back to the abovementioned example, the 3,600×4,800 pixel image would be stored as a Flashpix image with eight resolution layers as follows:

Layer #7: 3,600×4,800
Layer #6: 1,800×2,400
Layer #5: 900×1,200
Layer #4: 450×600
Layer #3: 225×300
Layer #2: 113×150
Layer #1: 57×75
Layer #0: 29×38

Each of these layers would be partitioned into a set of tiles, each tile being 64×64 pixels in size.

Figure 2:
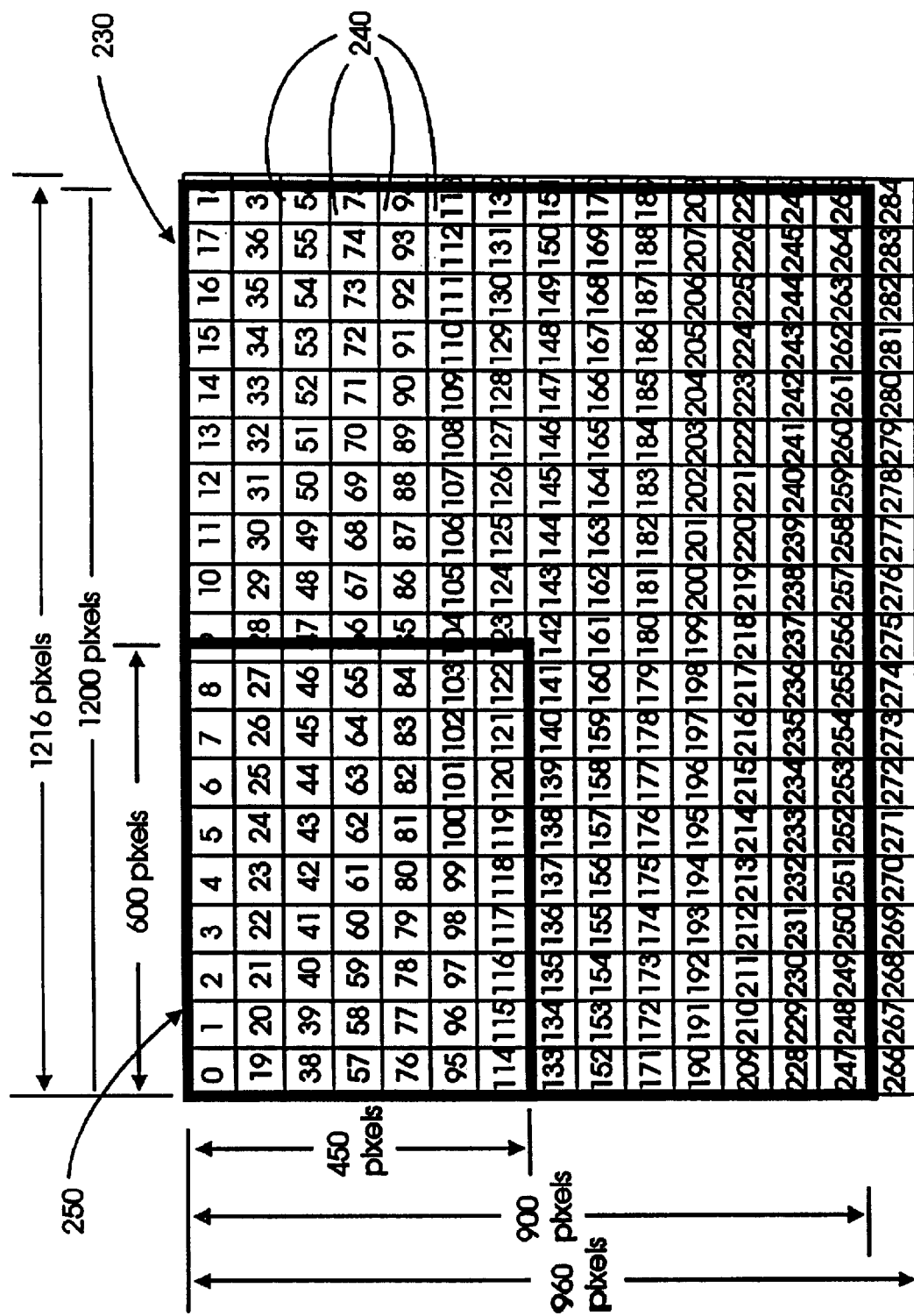
FIG. 2 is an illustration of an image portion and its relationship to tiles in one of the resolution layers of a multi-resolution image, used in connection with a preferred embodiment of the present invention.

Reference is now made to FIG. 2, which is an illustration of a portion of an image and its relationship to tiles in one of the resolution layers, used in connection with a preferred embodiment of the present invention. FIG. 2 illustrates how tiles are identified to satisfy a user request to view the top left quadrant of the above Flashpix image in a viewing window of 240×320 pixels. The requested image portion is (0, 0, 0.5, 0.5), using the notation for resolution independent rectangles described hereinabove, and the requested pixel dimensions are 240×320. This corresponds to a sampling frequency of 7.5 in each dimension.

The closest resolution layer in the Flashpix image that does not exceed this sampling frequency is Layer #5, designated by reference numeral 230, which has a sampling frequency of 4 in each dimension. The requested image portion can be generated by reducing the top left quadrant of the 900×1,200 resolution layer by a factor of 8/15. As illustrated, Layer #5 has 15 rows of tiles, each row having 19 tiles, the tiles being designated by reference numerals 240. Observe that some of the tiles extend beyond the right and bottom borders of the image in Layer #5. To obtain the top left quadrant image portion (0, 0, 0.5, 0.5) designated by reference numeral 250, it is necessary to extract data from the first 10 tiles in each of the top 8 rows of tiles, as these are the tiles that overlap with the image portion (0, 0, 0.5, 0.5). If the tiles are numbered serially from 0 to 284, as illustrated in FIG. 1, then the necessary tiles are 0–9, 19–28, 38–47, 57–66, 76–85, 95–104, 114–123 and 133–142.

These tiles can be retrieved from the Flashpix image and combined into a single image of dimensions 512×640 pixels. The combined image can then be cropped to a size of 450×600 pixels by cutting off the excess tile spillage at the right and bottom borders. The cropped image can be reduced by a factor of 8/15 to the desired target size of 240×320 pixels. This is more efficient than beginning with the full 3,600×4,800 pixel original image and re-sizing by a factor of 2/15. The final 240×320 image may be JPEG compressed and transmitted to the client for embedding in an HTML page.

In the above example, Layer #5 was chosen rather than Layer #4, since the top left quadrant of Layer #4 would have produced an image of 225×300 pixels, which would then have had to be enlarged by a factor of 16/15. Typically it is desirable to avoid enlargements, since they introduce artificial data.

Flashpix image data can be specified in standard RGB or PhotoYCC color spaces, or in another calibrated color space designated by an appropriate International Color Consortium (ICC) profile. The image data can also include an opacity channel to specify transparent and opaque parts of the image.

In addition to image data, Flashpix files contain meta-data, which is auxiliary data to the image. Meta-data includes information about the image, such as creator, contents, copyright, date and time created, date and time last modified, camera information, scanner information, etc. The meta-data also includes parameters for transformations to be applied to the image, such as rotations and scaling, general affine spatial transformations, contrast adjustment, color space transformations, etc.

Internet Imaging Protocol

A recently developed protocol, the Internet Imaging Protocol (IIP), specifies a method for a user to request portions of an image at a specific resolution. A reference for IIP is the document "Internet Imaging Protocol," © 1997 Eastman Kodak Company, Hewlett-Packard Company and Live Picture, Inc., the contents of which are hereby incorporated by reference.

A server with server-side software that supports IIP is referred to as an "image server." There are two generic ways to request image data from an image server using IIP; server-side processing of the request, and client-side processing of the request.

To illustrate server-side processing, suppose a user with a viewing window of 480×640 pixels desires to view the full image from the abovementioned example whose original size is 3,600×4,800 pixels. In accordance with IIP, the full image at a 480×640 pixel resolution for an initial view can be requested using the following IIP request, containing a set of IIP commands:

OBJ=iip,1.0&FIF=<image-name>&WID=640&HEI=480&CVT=jpeg.

This request specifies the version of IIP being used by means of the OBJ=iip,1.0 command. It specifies the desired image by means of the FIF command, and specifies the width and height of the viewing window by means of the WID and HEI commands, respectively. The last command, CVT, specifies the format of the image to be sent. As indicated above, the CVT command instructs the image server to convert the image data to the JPEG image format. Typically, the JPEG image transmitted from the image server to the client is embedded within an HTML page.

For the image server to process the above IIP request, the server must analyze the original image and generate a JPEG image with the requested specifications, specifically the desired portion and dimensions.

Similarly, the IIP request

OBJ=iip,1.0,&FIF=<image-name>&RGN=0.25,0.35,0.4, 0.6 &WID=640&HEI=320&CVT=jpeg specifies the rectangular portion with upper left coordinate at (0.25,0.35), height of 0.4 and width of 0.6, in resolution independent coordinates, and a viewing window of 320 pixels height by 640 pixels width. It also specifies that the designated image portion is to be returned as a single JPEG image. It can be verified that the requested image portion corresponds to a sampling frequency of 6 in each dimension.

In the above examples the image server does the image processing necessary to create a "ready for display" image for the client web browser. Alternatively, in a client-side processing application, the server can simply send the requested tiles to the client, and leave it up to client software to stitch the tiles together and resize.

To illustrate client-side processing, the IIP request

OBJ=iip,1.0&FIF=<image-name>&TIL=4,0–5 requests the image server to send tiles 0–5 from resolution Layer #4 within the designated image. Referring back to the Flashpix image from the abovementioned example, Layer #4 is the 450×600 version of the image. This version has 8 rows of 10 tiles. Tiles 0–5 within this layer are the first six tiles of the first row.

Tile ranges are interpreted as rectangular ranges of tiles, rather than serial ranges, with the first tile in the range representing the upper left tile in the rectangle, and the second tile in the range representing the lower right tile in the rectangle. Thus, referring back to FIG. 2, the 80 tiles that overlap with the desired image portion (namely, the top left quadrant) can be accessed by the single IIP request:

OBJ=iip,1.0&FIF=<image-name>&TIL=5,0–142.

IIP is independent of any particular image format. A CVT request for a desired image portion at desired pixel dimensions and a TIL request for tiles can be applied to any image format. For example, a JPEG image could be the object of a CVT or TIL command. If the image is not already in multi-resolution format, then the server is required to create the appropriate resolution from the original image data on-the-fly in order to process the IIP request. It may be appreciated that the redundancy in storage for a multi-resolution image format such as Flashpix balances the processing necessary to produce these resolutions on-the-fly for a single-resolution image format such as JEG.

Scalable Documents

The present invention concerns scalable documents—i.e., documents including raster images that are scalable. The raster images are referenced within pages of the document by dynamic references, and it is the control of the dynamic references that provides for the scalability. The pages of the scalable documents of the present invention can be enlarged or reduced to a wide range of resolutions, making the entire documents scalable—text characters, graphical objects and raster images. Regardless of the view, print or save parameters, a raster image in a scalable document automatically scales according to the desired resolution.

The raster images referenced within the pages of a scalable document can be located on image servers connected to the Internet or any other suitable computer network, viewed interactively, saved on remote computers and printed on network printers. Moreover each client computer accessing the scalable document preferably downloads only the portion of the image data that is necessary for satisfying the user display, print or save request.

The scalable document may also have raster images embedded therewithin in their entirety, and not merely by references. However, the present invention concerns raster images that are referenced but not stored within the document.

Storage of references to raster images rather than the images themselves within a document achieves two advantages. The first advantage is that it significantly reduces the size of the document, since raster images tend to be large data structures. This makes it possible for a user to quickly download all or parts of the document without the images. The user can interact with the document, such as by advancing pages or clicking on links, before the image data is downloaded.

The second advantage of storing references rather than raster images is that it provides for scalability; i.e. it provides an efficient way to automatically scale the raster image according to a desired display or print resolution. Consider the abovementioned example of a document containing an image that was scanned at 3,600×4,800 pixel dimensions. The original image is stored on an image server as an approximately 5 MB file, and not within the document. The document references the original image by means of a link.

If a user interactively displays the document on a video monitor, he cannot typically display the image contained therewithin at the full 3,600×4,800 pixel dimensions, as video monitors do not support pixel arrays this large. The display resolution depends on the resolution of the video monitor, the portion of the image being viewed and the portion of the video monitor on which the image is being viewed. For example, suppose the user is currently viewing the top left quadrant of the image in a viewing window of 240×320 pixel dimensions. If the original image was scanned at 600 dpi, as above, then the current view corresponds to a display resolution of 160 dpi., only 26.7% of the original resolution.

Moreover a viewing window of 240×320 only requires 230.4 KB of uncompressed image data (at a color depth of three bytes per pixel), which is approximately 23 KB of compressed image data, using the 10:1 ratio for high quality compression recited above. Using the present invention, only the 23 KB of image data necessary to render the desired display is downloaded. Moreover, as described hereinbelow, once this data is downloaded it is cached for subsequent use, so that whenever the same data is required again, it is not necessary to download it from the image server.

As can be seen from the abovementioned example, a user's request typically comprises (i) a designated portion of an image to be viewed, such as the top left quadrant, and (ii) a designated pixel dimension for display, save or print, or equivalently a designated resolution (in dpi or similar units) for display, save or print. According to a preferred embodiment of the present invention, the request can be encoded as a link within the document containing a request with commands, such as IIP commands, for retrieving a specific typically rectangular portion of an image at specific pixel dimensions.

The link to a raster image within a scalable document contains an identifier indicating the location of the raster image and a command specifying the rectangular portion needed and the required display pixel dimensions. The scalability of the document is achieved by dynamically changing the appropriate rectangular portion and appropriate display pixel dimensions that form part of the link, as a user interactively pans and zooms in and out of the document, and as the document is printed at various printer resolutions.

Figure 3:
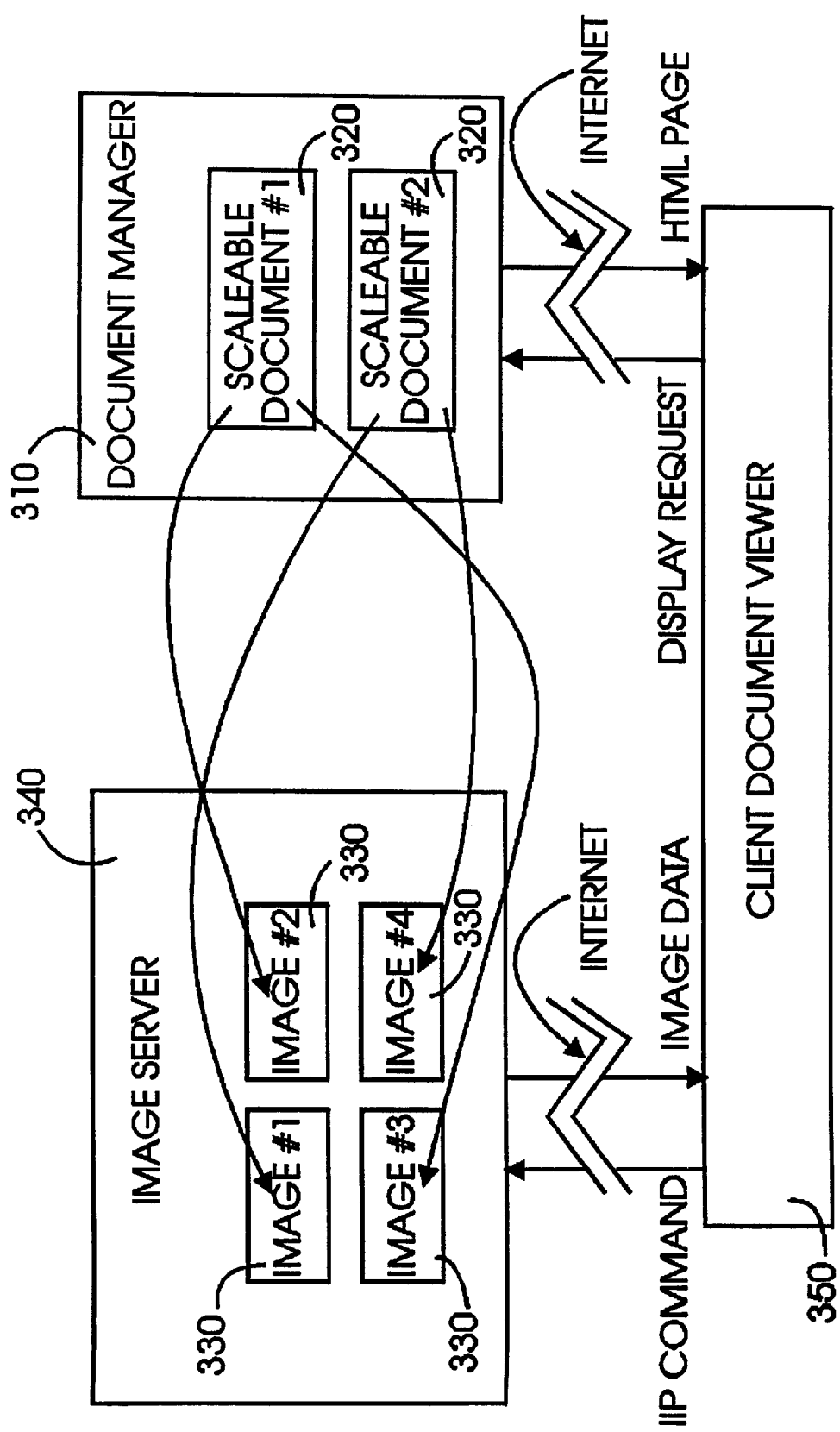
FIG. 3 is a simplified illustration of an Internet publishing system for publishing images over the Internet or any other suitable computer network, in accordance with a preferred embodiment of the present invention.

Reference is now made to FIG. 3 which is a simplified illustration of an Internet publishing system of the present invention for publishing images over the Internet or any other suitable computer network in accordance with a preferred embodiment of the present invention. An electronic document management system 310 contains several scalable documents 320. Each scalable document typically contains page layout information, font references, text characters and references to raster images 330 in the form of links. Scalable document #1 contains links to image #2 and image #3. Scalable document #2 contains links to image #1 and image #4. The raster images 330 are stored on an image server 340. A document viewer 350 accesses scalable document #1 via an Internet connection. Document viewer 350 may be part of a web browser or, alternatively, it may be auxiliary client software.

When document viewer 350 initially accesses document #1, an initial default display request for an initial page of the document containing image #2 and image #3 therewithin is transmitted from the client to the document manager. In turn, the document management system 310 preferably creates an HTML page with an appropriate layout for viewing the initial page and transmits the HTML page to document viewer 350. The layout includes positioning information for image #2 and image #3, and for text and other objects in the page. However, the HTML page does not contain the data for image #2 and image #3, but instead contains references, such as URLs, having image processing and data transfer commands, such as IIP commands, for retrieving the necessary image data from image server 340. Document viewer 350 transmits the IIP commands to image server 340 to retrieve the image data from image #2 and image #3 necessary for rendering the default display of the initial page. Image server 340 processes the images to obtain the requested image data, and transmits the image data to client document viewer 350. Document viewer 350 then embeds the image data into the initial page of document #1 and displays the HTML page with image #2 and image #3 embedded therewithin.

A user interactively views document #1 by advancing back and forth through pages, by zooming in and out of a page, and by navigating around the page. Each interactive user request for viewing document #1 initiates a corresponding display request for a specific requested page or portion thereof that is transmitted from document viewer 350 to document management system 310. As described above, the display request is translated into an HTML page containing an URL with an IIP request specifying appropriate rectangular portions and viewing pixel dimensions for an image within the page. The HTML page is transmitted from document manager 310 to document viewer 350, and the IIP request therewithin is sent from document viewer 350 to image server 340. Image server 340 processes the images to execute the IIP command and transmits the generated image data to document viewer 350. Document viewer 350 then displays the HTML page and the image data.

In an alternate embodiment of the present invention the IIP request may be sent by document manager 310 to image server 350. Image server 350 may transmit the generated image data to document manager 310 or directly to document viewer 350.

Figure 4A:
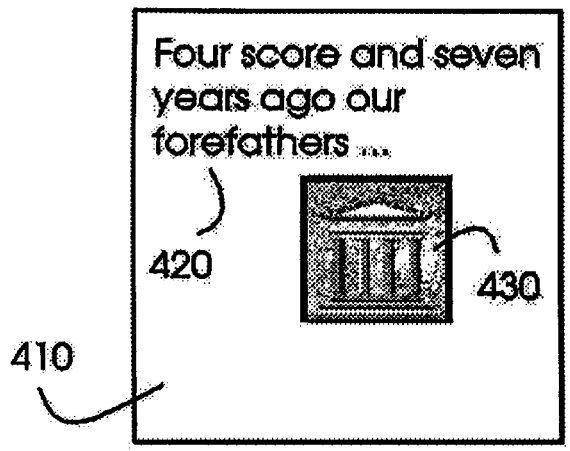
FIGS. 4A–4C are simplified illustrations of a page with text and images from a scalable document as seen at various display resolutions, in accordance with a preferred embodiment of the present invention.
Figure 4B:
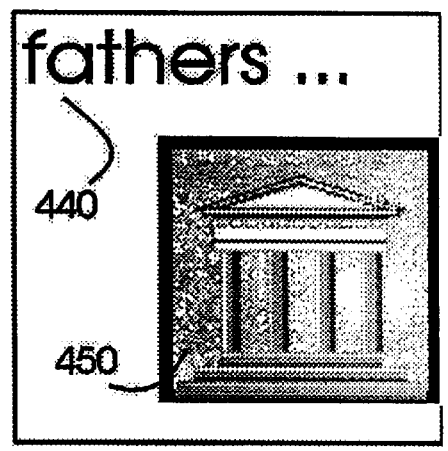
Figure 4C:
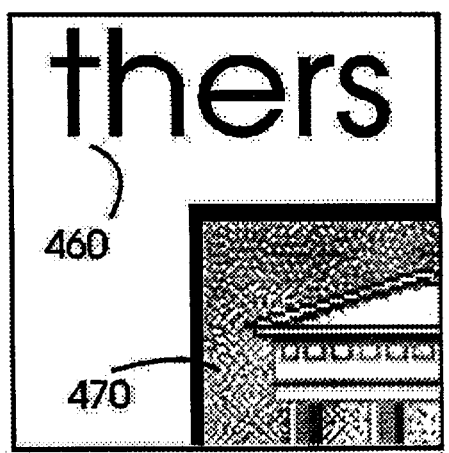

Reference is now made to FIGS. 4A–4C which are simplified illustrations of a page containing text and images from a scalable document as seen at various display resolutions, in accordance with a preferred embodiment of the present invention. A scalable document 410 is accessed by a client and displayed using an initial default view, as shown in FIG. 4A. The page contains font text data 420 and a raster image 430.

A user interactively views scalable document 410 and may zoom in on a portion of the page. The scalable document is automatically re-scaled so that both the text 440 and the image 450 are enlarged, as shown in FIG. 4B. The user may further zoom in on a portion of the page, and the scalable document is automatically re-scaled again so that both the text 460 and the image 470 are further enlarged, as shown in FIG. 4C. In an alternative embodiment of the present invention, the image can be opened in a separate window in the viewer, and interactively viewed within the separate window.

Universal Viewing

As described hereinbelow, the present invention combines methods from Universal Viewing with the scalability of fonts and vector graphical objects to produce an integrated fully-scalable document for interactive viewing. Specifically, the present invention uses methods from Universal Viewing to dynamically adjust the IIP requests within links of documents. Co-pending patent applications, U.S. Ser. No. 08/979,220 filed on Nov. 26, 1997 and U.S. Ser. No. 09/095,459 filed on Jun. 10, 1998, both entitled "A Method and System for HTML-Driven Interactive Image Client," the contents of which are hereby incorporated by reference, describe a new technology for interactive navigation of large images over the Internet or any other suitable computer network, without the use of auxiliary client software. This technology is referred to herein as "Universal Viewing."

Universal Viewing operates through the use of HTML pages, and enables a user to pan and zoom in and out of large images. It does not require use of a plug-in, a Java applet, an Active-X control, nor any other software that must be downloaded to a client computer. Universal Viewing operates by using server-side rendering as described hereinabove, along with appropriate dynamically changing IIP requests contained in references within an HTML page, corresponding to interactive user navigation requests.

Referring to the abovementioned example, an initial full view of the image can be generated within an HTML page by including the request with IIP commands:

OBJ=iip,1.0&FIF=<image-name>&WID=640&HEI= 480&CVT=jpeg.

These IIP commands serve to produce a view of the full image in a 640×480 view window on a user's video monitor.

Suppose the user clicks near the top left corner of the image in order to zoom in on the top left quadrant of the image. The client web browser sends to the server the location of the coordinates where the user clicked, and in turn the server replaces the IIP commands within the HTML page with the following revised commands:

OBJ=IIP,1.0&FIF=<image-name>&RGN=0.0,0.0,0.5,0.5
&WID=640&HEI=480&CVT=jpeg.

As a result, the top left quadrant of the image, corresponding to the indicated region, appears enlarged to fill the 640×480 view window on the user's video monitor.

Suppose next that the user clicks on a directional arrow in the display, pointing to the right, in order to pan to the right. The web browser sends to the server a URL activated by the user click on the rightward pointing directional arrow, and in turn the server replaces the IIP commands within the HTML page with the following commands:

OBJ=iip,1.0&FIF=<image-name>&RGN=0.0,0.25,0.5,0.5
&WID=640&HEI=480&CVT=jpeg.

These commands produce a view of the portion of the top half of the image centered between 25% and 75% of the full image width, within a 640×480 view window.

Finally, suppose that the user next clicks on a zoom button to zoom in at the center of the image portion currently being displayed. The client web browser sends to the server a URL activated by the user click on the zoom button, and in turn the server replaces the IIP commands within the HTML page with the following commands:

OBJ=iip,1.0&FIF=<image-name>&RGN=0.125,0.375,
0.25,0.25 &WID=640&HEI=480&CVT=jpeg.

These commands produce a view of the portion of the image between 12½% and 37½% of the image height, and between 37½% and 62½% of the image width—i.e., the central portion of the previous region, enlarged to fill the 640×480 view window.

Figure 5:
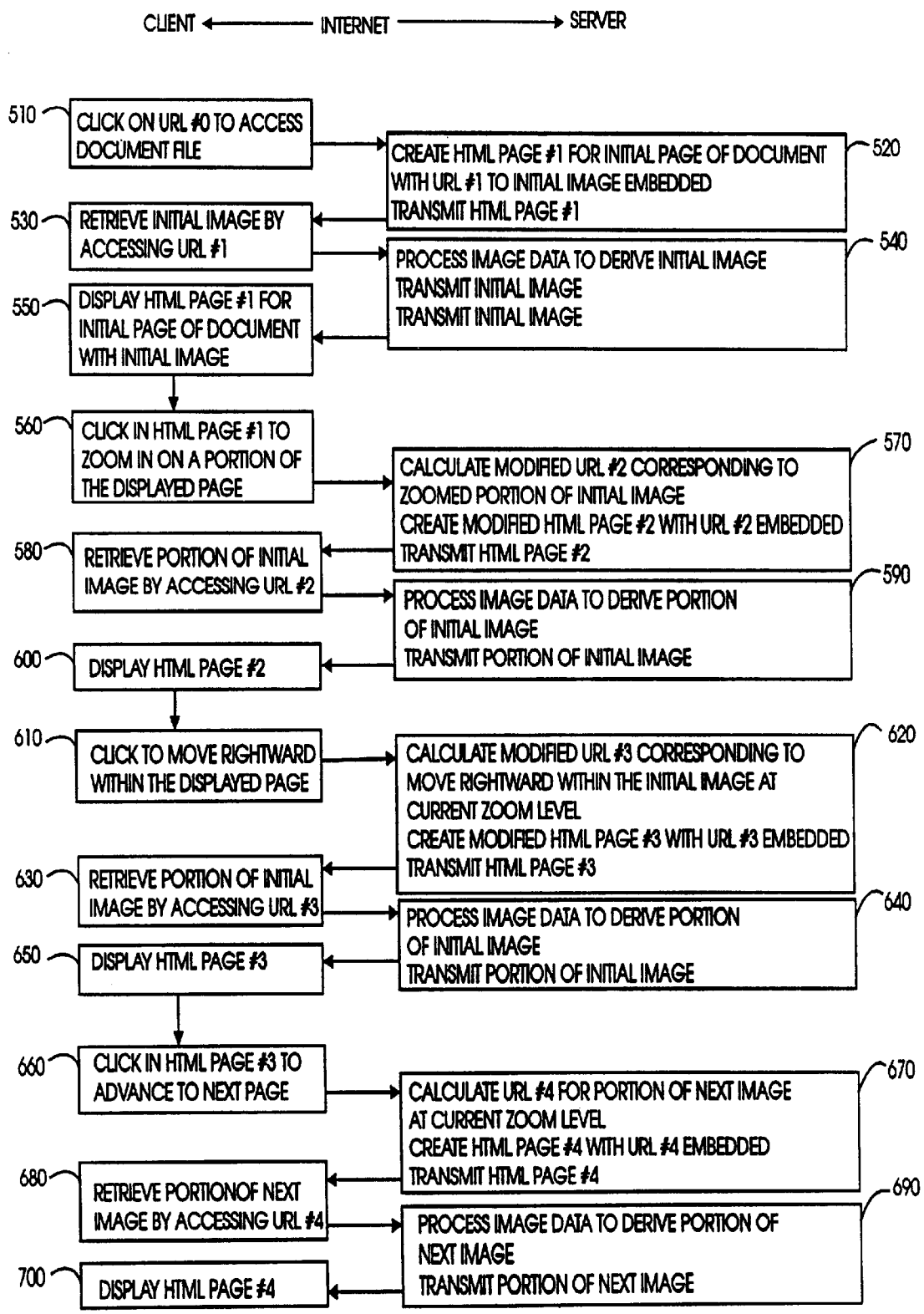
FIG. 5 is a simplified flowchart of the operation of a document viewer in accordance with a preferred embodiment of the present invention.

Reference is now made to FIG. 5, which is a simplified flowchart of a document viewer in accordance with a preferred embodiment of the present invention. Illustrated in FIG. 5 is a sample interactive viewing session during which a client interactively views a document containing a high quality image stored on a server computer. In the sample session the client views an initial page of the document with an image. The client clicks to zoom in on the page, then navigates to move to the right and then advances to a next page.

At step 510 the client clicks on a URL to a document file in a web page. At step 520 the server creates a first HTML page appropriate to view an initial page of the document with a URL containing an IIP request for the image contained therein, and transmits this page to the client. At step 530 the client receives the HTML page with the URL, and a web browser within the client, upon processing the page, accesses the URL that references the image and sends the IIP request within the URL to an image server containing the image. At step 540 the image server processes image data to execute the IIP request and generate the requested image, and then transmits the requested image to the client. At step 550 the web browser displays the HTML page with the image.

At step 560 the user, while viewing the first HTML page, clicks to zoom in on a portion of the displayed page. The zoom can be activated by the user clicking on an icon such as a magnifying glass, or by clicking at a location within the image, or both. At step 570 the server creates a second HTML page with a URL containing an IIP request corresponding to the zoomed portion of the initial image that is to appear in the zoomed portion of the initial page, and transmits this page to the client. At step 580 the client receives the second HTML page with the URL, and the web browser, upon processing the second page, accesses the URL that references the zoomed image portion and sends its IIP request to the image server. At step 590 the image server processes image data to execute the IIP request and generate the requested image, and then transmits the requested image to the client. At step 600 the web browser displays the second HTML page with the zoomed image portion.

At step 610 the user, while viewing the second HTML page, clicks to move rightward within the displayed page. Since the second HTML page only displays a portion of the initial document page, the user must navigate to see other portions of this page. At step 620 the server creates a third HTML page with a URL containing an IIP request corresponding to the portion of the initial image that is to appear in the rightward zoomed portion of the initial page, and transmits this page to the client. At step 630 the client receives the third HTML page with the URL, and the web browser, upon processing the third page, accesses the URL that references the rightward zoomed image portion and sends its IIP request to the image server. At step 640 the image server processes image data to execute the IIP request and generate the requested image, and then transmits the requested image to the client. At step 650 the web browser displays the third HTML page with the rightward zoomed image portion.

At step 660 the user, while viewing the third HTML page, clicks to advance to the next page within the document. In the embodiment illustrated in FIG. 5, the next page appears at the same portion and zoom factor as the current page. However, it should be apparent to those skilled in the art that other choices can be implemented, such as resetting the view of the next page to the default view of the first page. At step 670 the server creates a fourth HTML page with a URL containing an IIP request corresponding to the zoomed portion of the image that is to appear in the next page, and transmits this page to the client. At step 680 the client receives the fourth HTML page with the URL, and the web browser, upon processing the fourth page, accesses the URL that references the zoomed portion of the next image and sends its IIP request to the image server. At step 690 the image server processes image data to execute the IIP request and generate the requested image, and then transmits the requested image to the client. At step 700 the web browser displays the fourth HTML page with a zoomed portion of the next document page and its image.

Caching

The present invention uses caching in order to achieve improved performance. One of the advantages of client-side processing over server-side processing is the ability to cache responses. As described above, client-side processing operates by transmitting individual tiles from the server to the client, and these tiles can be cached by the client as they are received, thereby obviating the need to transmit them again. The tile cache can be built up on the client, and as each additional interactive navigational request is processed, the client can determine which tiles among the tiles necessary to fulfill the request are already present in cache, and request from the server only those tiles that are not available. Thus, for example, when a user pans slightly to the right, only the newly exposed tiles have to be transmitted from the server to the client.

The success of caching stems from the fact that a user interactively navigating through a large image typically returns to the same image data in a recurrent fashion. Zooming in and out, and panning up, down, left and right, typically lead through some of the same image data. This phenomenon is atypical for media such as video for which the usual viewing mode is simply to play the frames of the video forward, and the same data is usually not accessed more than once in a single session.

Server-side processing is not as amenable to caching, since the regions corresponding to each interactive user request do not necessarily repeat themselves. That is, a user does not always return to the same exact regions he requested earlier, since regions are specified by floating point numbers rather than integer-valued indices.

In order to optimize Universal Viewing for caching, the number of possible navigational options is restricted to a relatively small set. For example, when viewing a full image a Universal Viewing system can restrict the possible zooms to enlargements of the nine regions:
RGN=0.0,0.0,0.5,0.5
RGN=0.0,0.25,0.5,0.5
RGN=0.0,0.5,0.5,0.5
RGN=0.25,0.0,0.5,0.5
RGN=0.25,0.25,0.5,0.5
RGN=0.25,0.5,0.5,0.5
RGN=0.5,0.0,0.5,0.5
RGN=0.5,0.25,0.5,0.5
RGN=0.5,0.5,0.5,0.5

Each of these regions has half of the full image height and half of the full image width, and fitting them to the size of the full view window gives the effect of an enlargement. To select one of these regions a user may click somewhere inside the image, and, depending on where the mouse coordinates are, a corresponding region is selected. The simplest correspondence is to divide the image into a 3×3 "tic-tac-toe" partition, and to associate each of the above regions with a corresponding area of the 3×3 partition.

In turn, when viewing one of the above regions, the Universal Viewing system can offer the same nine relative sub-regions for further zooming in. In addition, the Universal Viewing system can offer panning capability from any one of the regions above to those regions that overlap with it. For example, if the current region being viewed is the middle region
RGN=0.25,0.25,0.5,0.5
then a pan to the right corresponds to the region
RGN=0.25,0.5,0.5,0.5
and a pan to the bottom corresponds to the region
RGN=0.5,0.25,0.5,0.5
To select a navigational direction the user can click on one of eight directional arrows pointing in the compass directions N, NE, E, SE, S, SW, W and NW, and the Universal Viewing system moves the image 25% across and/or up or down in the direction of choice, until a boundary of the image is reached.

The advantage of such a system is that the possible regions are limited, and repeat themselves as the user zooms in and out and navigates in the eight compass directions. The JPEG images transmitted from the server to the client can be cached using an indexing system based on the regions. Whenever a user returns to the same region, the cached data can be used immediately, avoiding the need for sending a request to the image server.

Universal Viewing with a restricted number of regions has less functionality than a client-side processing solution using a plug-in or Java applet. For example, one cannot perform a continuous pan through an image using Universal Viewing as described above. However, for many applications the limited functionality suffices. One such application is interactive viewing of documents, for which continuous navigation is not a requirement.

Web-Ready Documents

The scalable documents of the present invention are created by means of a rendition tool that creates a "Web-Ready" document by converting a standard document containing images, such as the portable document format (PDF) of Adobe Systems, Inc., into a scalable document. The rendition tool operates by (i) extracting raster images embedded within the standard document, (ii) storing the raster images on an image server, and (iii) replacing the raster images with references to the stored images, the references containing IIP requests, and inserting the references into the document.

When a Web-Ready document is displayed on a video monitor, the high-resolution images originally contained within the standard document are replaced with appropriate screen-size images. Moreover, in a preferred embodiment of the present invention, each page or portion of a page to be viewed is converted to a GIF image and embedded within an HTML page that contains buttons to assist with page turning, zooming, printing and thumbnail viewing. The HTML page is ready for display by a client web browser, without the need for auxiliary client-side software. A new GIF image and HTML page are generated in response to each user navigational request. GIF images are used instead of JPEG images when text fonts are present, since JPEG compression tends to produce noticeable artifacts in text fonts.

Such a Web-Ready document can be viewed interactively by user navigation in a client-less environment. It can also be printed and saved at a specified dpi resolution. In each case the raster images contained in the pages of the document along with the fonts and vector graphical objects are scaled appropriately. In a preferred embodiment of the present invention, when a user saves a Web-Ready document, he can select a desired resolution for the save operation. Upon save, the Web-Ready file is converted back to a standard document with raster images, rather than references, embedded therewithin at the user-specified resolution. Similarly, in a preferred embodiment of the present invention, when a user prints a Web-Ready document, the document is converted back to a standard document with raster images embedded at the resolution appropriate to the output device.

The conversion back from a Web-Ready document to a standard document is performed by means of a delivery tool. The delivery tool reverses the operations performed by the rendition tool, and operates by (i) processing the images stored on the image server to produce appropriately scaled images, (ii) removing the references to the stored images, and (iii) embedding the appropriately scaled images into the document.

Figure 6:
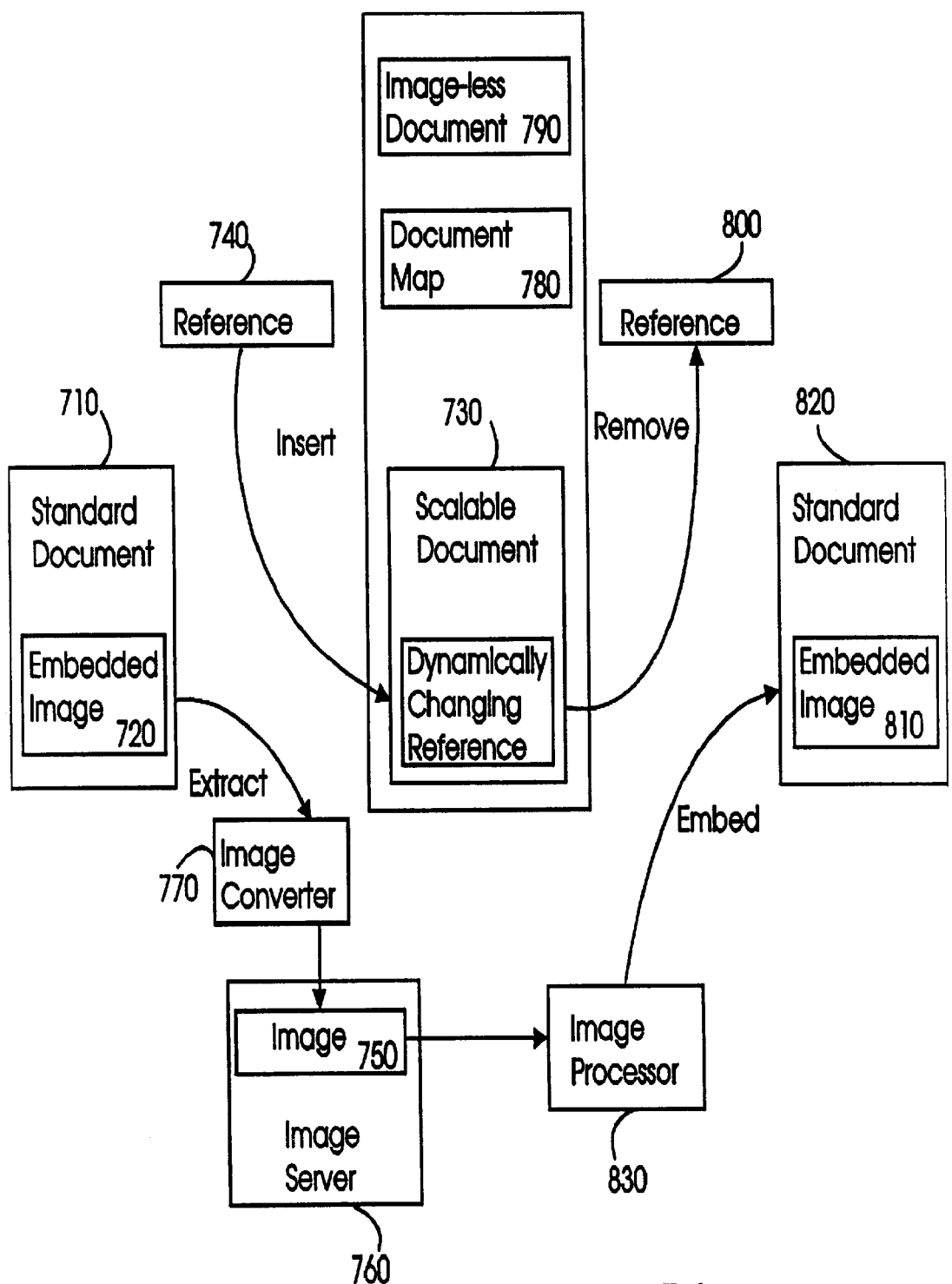
FIG. 6 is a simplified illustration of a rendition tool for converting standard documents to scalable documents, and a delivery tool for converting scalable documents to standard documents.

Reference is now made to FIG. 6, which is a simplified illustration of a rendition tool for converting standard documents to scalable documents, and a delivery tool for converting scalable documents to standard documents. FIG. 6 illustrates a rendition tool that converts a standard document 710, such as a PDF document, containing an embedded image 720 into a scalable document 730. To achieve scalability, image 720 is extracted from standard document 710 and replaced with a reference 740 that contains image processing commands. In a preferred embodiment of the present invention the image processing commands include an IIP CVT command. Embedded image 720 is stored as an image 750 on an image server 760. Image 750 may be a Flashpix image, obtained from embedded image 720 by means of converter unit 770. Reference 740 and the image processing commands therewithin refer to image 750.

In an alternate embodiment of the present invention, auxiliary data is generated with scalable document 730, such as (i) a document map 780 that stores the position information for image 750 and any other images that are removed from standard document 710, and (ii) an image-less document 790. Scalable document 730 is Web-Ready for interactive viewing through a web browser.

Conversely, as described above, for print and save operations it is necessary to generate a standard document, such as a PDF document, from a scalable Web-Ready document. FIG. 6 also illustrates a delivery tool that converts scalable document 730 into a standard document 820 by using a reference 800 contained within scalable document 730. Reference 800 refers to stored image data, such as image 750, and contains image processing commands operative on the stored image data. To accomplish the conversion, reference 800 is removed from scalable document 730 and image 810 is embedded in its stead, to produce a standard document 820. Embedded image 810 is generated from image 750 by image processor 830, using the image processing commands contained in reference 800, to produce an image at the appropriate resolution for the printer or at the resolution specified by the user for saving. As such, embedded image 810 may be at a different resolution than embedded image 720.

In an alternate embodiment of the present invention, standard document 820 is constructed from image-less document 790, with document map 780 being used to correctly position embedded image 810 within standard document 820.

It should be appreciated by those skilled in the art that when converting scalable document 730 to standard document 820, reference 800 may be external to scalable document 730. Such a reference may be generated directly from a print or delivery (i.e. save) request, based upon characteristics of the printer or based upon a user-specified resolution for delivery, and need not be part of scalable document 730. In such a case it is unnecessary to remove reference 800 from scalable document 830. The image processing commands within reference 800 are used by image processor 830 to generate embedded image 810 from stored image 750, and then image 810 is embedded into standard document 820.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

What is claimed is:

1. A method for viewing a document located on a server computer, comprising:

sending by a client computer a page display request to said server computer to view a page of a document, said page including text and image data;

creating by said server computer a layout page containing a reference to stored image data, the reference including parameters for a rectangle designating an image portion;

transmitting said layout page from said server computer to the said client computer;

sending by said client computer an image data request to a remote computer according to said reference to stored image data;

transmitting requested image data from said remote computer to said client computer in response to said image data request;

repeating said sending a page display request, said sending an image data request by said client computer and transmitting requested image from said remote computer, for subsequent page display request for a magnified view of the page of the document;

dynamically changing the parameters for a rectangle corresponding to the subsequent page display request; and wherein the parameters for a rectangle and the parameters for a display width and height are included within a CVT command from an Internet Imaging Protocol.

2. The method of claim 1 wherein the document is a PDF document.

3. The method of claim 1 wherein the reference to stored image data is a URL.

4. The method of claim 1 wherein the reference to stored image data also includes parameters for a display width and height.

5. The method of claim 1 wherein the at least one image is a tiled image.

6. The method of claim 1 wherein the at least one image is a multi-resolution image.

7. The method of claim 6 wherein the at least one image is a FLASHPIX image.

8. The method of claim 1 wherein the at least one image is a JPEG image.

9. The method of claim 1 wherein the at least one image is a TIFF image.

10. The method of claim 1 wherein the layout page specifies the positioning of the requested image data.

11. The method of claim 1 wherein the layout page is an HTML page.

12. The method of claim 1 wherein the layout page also contains text characters.

13. The method of claim 12 wherein each of the text characters is associated with a corresponding font.

14. The method of claim 12 wherein the layout page specifies the positioning of the text characters.

15. The method of claim 1 and also including displaying the layout page and the requested image data.

16. The method of claim 1 and also including printing the layout page and the requested image data.

17. The method of claim 1 wherein the remote computer is the server computer.

18. The method of claim 1 wherein the remote computer is distinct from the server computer.

19. The method of claim 1 and also including processing by remote computer the stored image data to produce the requested image data.

20. The method of claim 19 wherein the stored image data contains image titles, and said processing includes:

fetching appropriate image tiles from the stored image data;

combining the appropriate image tiles into a single combined image; and converting the combined image into a specified image format.

21. The method of claim 20 wherein the specified image format is the JPEG format.

22. The method of claim 20 and also including:

decompressing the appropriate image tiles; and compressing the combined image.

23. A system for viewing a document located on a server computer, comprising:

a client computer transmitter sending a page display request to the server computer to view a page document, said page including text and image data, and sending by said client computer transmitter an image data request to a remote computer according to a reference to stored image data, said reference including parameters for a rectangle designating an image portion;

a layout page producer within said server computer creating a layout page containing said reference to stored image data;

said server computer transmitter transmitting said layout page to said client computer; and said remote computer transmitter transmitting requested image data to said client computer in response to said image data request;

a reference generator dynamically changing said parameters for a rectangle corresponding to a subsequent page display request for a magnified view of the page of the document.

24. The system of claim 23 wherein the document is a PDF document.

25. The system of claim 23 wherein the reference to stored image data is a URL.

26. The system of claim 23 wherein the reference to stored image data also includes parameters for a display width and height.

27. The system of claim 23 wherein the at least one image is a tiled image.

28. The system of claim 23 wherein the at least one image is a multi-resolution image.

29. The system of claim 28 wherein the at least one image is a FLASHPIX image.

30. The system of claim 23 wherein the at least one image is a JPEG image.

31. The system of claim 23 wherein the at least one image is a TIFF image.

32. The system of claim 23 wherein the layout page specifies the positioning of the requested image data.

33. The system of claim 23 wherein the layout page is an HTML page.

34. The system of claim 23 wherein the layout page also contains text characters.

35. The system of claim 34 wherein each of the text characters is associated with a corresponding font.

36. The system of claim 34 wherein the layout page specifies the positioning of the text characters.

37. The system of claim 23 and also including a video monitor displaying the layout page and the requested image data.

38. The system of claim 23 and also including a printer printing the layout page and the requested image data.

39. The system of claim 23 wherein the remote computer is the server computer.

40. The system of claim 23 wherein the remote computer is distinct from the server computer.

41. The system of claim 23 and also including a processor within the remote computer processing the stored image data to produce the requested image data.

42. The system of claim 41 wherein the stored image data contains image tiles, and said processor includes:

a data access unit fetching appropriate image tiles from the stored image data;

a combiner combining the appropriate image tiles into a single combined image; and a formatter converting the combined image into a specified image format.

43. The system of claim 42 wherein the specified image format is the JPEG format.

44. The system of claim 42 and wherein said processor also includes:

a decompress or decompressing the appropriate image tiles; and a compressor compressing the combined image.

45. A scalable document comprising:

at least one layout page; and at least one reference to stored image data, said at least one reference including at least one command for processing the stored image data;

wherein the parameters for a rectangle and the parameters for a display width and height are included within said command, said command comprising a CVT command from an Internet Imaging Protocol.

46. The scalable document of claim 45 wherein the reference to stored image data is a URL.

47. The scalable document of claim 45 wherein the command for processing the stored image data specifies a rectangular portion of a raster image and a display width and height.

48. The scalable document of claim 45 wherein the at least one image is a tiled image.

49. The scalable document of claim 45 wherein the at least one image is a multi-resolution image.

50. The scalable document of claim 49 wherein the at least one image is a FLASHPIX image.

51. The scalable document of claim 45 wherein the at least one image is a JPEG image.

52. The scalable document of claim 45 wherein the at least one image is a TIFF image.

53. The scalable document of claim 45 wherein the layout page specifies the positioning of the requested image data.

54. The scalable document of claim 45 wherein the layout page is an HTML page.

55. The scalable document of claim 45 wherein the layout page also contains text characters.

56. The scalable document of claim 55 wherein each of the text characters is associated with a corresponding font.

57. The scalable document of claim 55 wherein the layout page specifies the positioning of the text characters.

58. A method for converting a document containing at least one image into a scalable document, comprising:

extracting at least one image from the document;

storing the at least one image as stored image data;

replacing said at least one image by at least one reference to stored image data, said at least one reference containing at least one command for processing said stored image data; and wherein the parameters for a rectangle and the parameters for a display width and height are included within said command, said command comprising a CVT command from an Internet Imaging Protocol.

59. The method of claim 58 wherein the document is a PDF document.

60. The method of claim 58 wherein the stored image data is tiled image data.

61. The method of claim 58 wherein the stored image data is multi-resolution image data.

62. The method of claim 61 wherein the stored image data is FLASHPIX image data.

63. The method of claim 58 wherein the stored image data is JPEG image data.

64. The method of claim 58 wherein the stored image data is a TIFF image data.

65. The method of claim 58 wherein the reference to the stored image data is a URL.

66. The method of claim wherein the command for processing the stored image data specifies a rectangular portion of a raster image and a display width and height.

67. A system for converting a document containing at least one image into a scalable document, comprising:
- an object extractor extracting at least one image from the document;
- a storage device for storing said at least one image as stored image data;
- a reference inserter replacing said at least one image by at least one reference to the stored image data, said at least one reference containing at least one command for processing said stored image data; and
- wherein the parameters for a rectangle and the parameters for a display width and height are included within said command, said command comprising a CVT command from an Internet Imaging Protocol.

68. The system of claim 67 wherein the document is a PDF document.

69. The system of claim 67 wherein the stored image data is tiled image data.

70. The system of claim 67 wherein the stored image data is multi-resolution image data.

71. The system of claim 70 wherein the stored image data is FLASHPIX image data.

72. The system of claim 67 wherein the stored image data is JPEG image data.

73. The system of claim 67 wherein the stored image data is a TIFF image data.

74. The system of claim 67 wherein the reference to the stored image data is a URL.

75. The system of claim 67 wherein the command for processing the stored image data specifies a rectangular portion of a raster image and a display width and height.

76. A method for converting a scalable document into a standard document using at least one reference to stored image data, the scalable document containing at least one layout page, and the at least one reference including at least one command for processing said stored image data, comprising:
- processing said stored image data in accordance with said at least one command, producing at least one image;
- and positioning said at least one image within the scalable document according to positioning instructions within the layout page; and
- wherein the parameters for a rectangle and the parameters for a display width and height are included within said command, said comprising a CVT command from an Internet Imaging Protocol.

77. The method of claim 76 and also including converting the scalable document into a format of the standard document, following said positioning.

78. The method of claim 76 wherein the standard document is a PDF document.

79. The method of claim 76 wherein said processing extracts a specified rectangular portion of an image at a specified width and height.

80. The method of claim 76 and also including printing the standard document.

81. The method of claim 76 and also including saving the standard document on a computer.

82. A system for converting a scalable document into a standard document using at least one reference to stored image data, the scalable document containing at least one layout page, and the at least one reference including at least one command for processing the stored image data, comprising:
- an image processor processing said stored image data in accordance with the at least one command, producing at least one image;
- an image positioner positioning said at least one image within the scalable document according to positioning instructions within the layout page; and
- wherein the parameters for a rectangle and the parameters for a display width and height are included within said command, said command comprising a CVT command from an Internet Imaging Protocol.

83. The system of claim 82 and also including a document format converter converting the scalable document into a format of the standard document.

84. The system of claim 82 wherein the standard document is a PDF document.

85. The system of claim 82 wherein said image processor extracts a specified rectangular portion of an image at a specified width and height.

86. The system of claim 82 and also including a printer for printing the standard document.

87. The system of claim 82 and also including a computer for saving the standard document.

88. A machine readable medium having executable computer program instructions which when executed on a processing system cause the processing system to perform a method comprising:
- sending by a client computer a page display request to a first remote computer to view a page of a document, said page including text and image data;
- receiving at said client computer in response to said page display request, the layout page containing a reference to stored image data from said first remote computer, said reference including parameters for a rectangle designating an image portion;
- receiving a requested image data at said client computer in response to an image data request to a second remote computer according to said reference to stored image data;
- repeating said sending a page display request and sending an image data request by said client computer and receiving a requested image data from said second remote computer, for subsequent page display request for a magnified view of the page of the document;
- dynamically changing the parameters for a rectangle corresponding to the subsequent page display request; and
- wherein the parameters for a rectangle and the parameters for a display width and height are included within a CVT command from an Internet Imaging Protocol.

89. The machine readable medium of claim 88 wherein the reference to stored image data also includes parameters for a display width and height and wherein said requested image data is received from a second remote computer.

90. The machine readable medium of claim 89 wherein the parameters for a rectangle and the parameters for a display width and height are included within a CVT command from an Internet Imaging Protocol.

* * * * *

UNITED STATES PATENT AND TRADEMARK OFFICE
CERTIFICATE OF CORRECTION

PATENT NO. : 6,449,639 B1
DATED : September 10, 2002
INVENTOR(S) : Robert Blumberg It is certified that error appears in the above-identified patent and that said Letters Patent is hereby corrected as shown below:

<u>Title page,</u>
Item [73], Assignee, delete "Doxio, Inc." and replace with -- Roxio, Inc. --

Signed and Sealed this

Twentieth Day of April, 2004

JON W. DUDAS
*Acting Director of the United States Patent and Trademark Office*